United States Patent
Bonte et al.

(10) Patent No.: US 9,402,346 B2
(45) Date of Patent: Aug. 2, 2016

(54) BALER WITH START-UP CONTROL SYSTEM

(71) Applicant: CNH Industrial America LLC, New Holland, PA (US)

(72) Inventors: Xavier G. J. M. Bonte, Et Sint Kruis (NL); Pieter Vandevelde, Sint Michiels Brugge (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/768,617

(22) PCT Filed: Feb. 18, 2014

(86) PCT No.: PCT/EP2014/053067
§ 371 (c)(1),
(2) Date: Aug. 18, 2015

(87) PCT Pub. No.: WO2014/128097
PCT Pub. Date: Aug. 28, 2014

(65) Prior Publication Data
US 2016/0000015 A1    Jan. 7, 2016

(30) Foreign Application Priority Data
Feb. 20, 2013  (BE) .................................. 2013/0111

(51) Int. Cl.
*A01F 15/04*    (2006.01)
*A01F 15/08*    (2006.01)
*A01D 69/00*   (2006.01)

(52) U.S. Cl.
CPC ............ *A01F 15/0841* (2013.01); *A01D 69/00* (2013.01); *A01F 15/04* (2013.01)

(58) Field of Classification Search
CPC ...... A01F 15/04; A01F 15/0841; A01D 69/00; A01D 69/002; A01D 69/005; A01D 69/08; B30B 15/14; B30B 1/26; B30B 1/266
USPC ........... 100/179, 188 R, 189, 280, 282, 4, 35, 100/48; 56/341
See application file for complete search history.

(56) References Cited

U.S. PATENT DOCUMENTS

| | | | | |
|---|---|---|---|---|
| 3,525,302 A * | 8/1970 | Eberly | ................ | A01F 15/0841 100/179 |
| 5,894,718 A * | 4/1999 | Hawlas | ............... | A01F 15/0841 100/88 |
| 6,105,353 A * | 8/2000 | Mohr | ................... | A01D 69/005 475/153 |
| 2003/0159421 A1 * | 8/2003 | Trelstad | ............. | A01F 15/0841 56/341 |
| 2010/0108413 A1 | 5/2010 | Lang et al. | | |
| 2012/0310491 A1 | 12/2012 | Vermeulen | | |

FOREIGN PATENT DOCUMENTS

| | | |
|---|---|---|
| EP | 0933018 A2 | 8/1999 |
| EP | 1974601 A1 | 10/2008 |

* cited by examiner

*Primary Examiner* — Jimmy T Nguyen
(74) *Attorney, Agent, or Firm* — Patrick M. Sheldrake (57) ABSTRACT

A baler has a flywheel, a plunger connected to the flywheel via a crank, an auxiliary motor for rotating the flywheel in a reverse direction and a start-up control system comprising a sensor for providing a signal indicative for the position of the crank and a control unit for controlling the auxiliary motor for rotating the flywheel in reverse direction to a predetermined launch position for enabling the flywheel to gain sufficient kinetic energy before the first plunger impact, at the next start-up.

12 Claims, 4 Drawing Sheets

BALER WITH START-UP CONTROL SYSTEM

This application is the U.S. National Stage filing of International Application Serial No. PCT/EP2014/053067 filed on Feb. 18, 2014 which claims priority to Belgian Application BE2013/0111 filed Feb. 20, 2013, each of which is incorporated herein by reference in its entirety.

FIELD OF THE INVENTION

The present invention relates to the field of agricultural balers for producing bales by compressing agricultural crop material. More specifically, the present invention relates to the start-up of towable square balers having a heavy flywheel for producing high-density bales.

BACKGROUND OF THE INVENTION

When a tractor is used for towing a baler, the power take-off (PTO) shaft of the tractor is coupled by way of a flywheel of the baler to a gearbox that drives the various mechanisms used in the baler to pick-up the crop from a field, to form the crop into bales and to wrap twine around the bales. A one-way clutch is arranged between the PTO shaft and the flywheel to allow the flywheel to rotate faster than the PTO shaft.

A large flywheel is required in a baler, especially in large square balers, to overcome peak loads encountered by the baler gearbox and this creates a problem when starting the baler. The PTO shaft, when driven by the tractor engine at the speed at which it needs to turn to drive the baler during normal operation, may not be able to provide the high torque needed to bring the flywheel up to its steady speed (e.g. 1000 rpm). As a result, when the baler is hitched to the tractor and its flywheel is connected to the tractor PTO shaft, the tractor engine may stall or a safety mechanism may declutch the PTO from the tractor engine on account of the high load on the PTO shaft when the baler is started.

A solution to this problem proposed in EP1974601 is to use a hydraulic motor to supplement the torque provided by the PTO shaft when starting the rotation of the baler flywheel. This solution is not entirely satisfactory because it requires a powerful hydraulic motor, with a power comparable to that of the tractor PTO.

Another solution to this problem is disclosed in WO2011060995, where a tractor with a change speed gearbox is described, which allows the baler to start-up in two phases. In the first phase the flywheel is accelerated to a first speed using a first transmission ratio of the change speed gearbox, and in the second phase the flywheel is accelerated to a second speed using a second transmission ratio of the change speed gearbox. A disadvantage of this technique is that it requires a tractor with a change speed gearbox.

SUMMARY OF THE INVENTION

It is an object of embodiments of the present invention to provide a baler with a good, e.g. an improved, start-up behavior.

It is also an object of embodiments of the present invention to provide a method for upgrading an existing baler for improving its start-up behavior.

The above objectives are accomplished by methods and devices according to embodiments of the present invention.

In a first aspect, the present invention provides a baler comprising a shaft and a flywheel connected to the shaft and adapted for rotating in a forward direction for producing bales; a plunger connected to the flywheel via a crank, the plunger being adapted for performing a reciprocal movement between a near position in which crop material may be added in a bale chamber, and a distal position in which the crop material is compressed in the bale chamber; and an auxiliary motor connectable to the flywheel for starting up rotation thereof. The baler further comprises a start-up control system, comprising at least one sensor indicative for a position of the crank; and a control unit operably connected to the at least one sensor and adapted for controlling the auxiliary motor for rotating the flywheel in reverse direction to a predetermined launch position.

By deliberately positioning the flywheel in a predefined launch position, at start-up, when being accelerated by a tractor PTO, the flywheel can gain more kinetic energy than is required for compressing the crop material present in the bale chamber. In other words, starting from the predetermined launch position enables the flywheel to "survive" the first plunger impact, and to continue rotating as a successful start-up.

In this way, the risk of start-up failures is highly reduced or even completely eliminated. This also reduces the wear of the tractor and baler, in particular the PTO clutch, and reduces the risk of injuries. It also increases work efficiency, since no time is lost anymore for starting-up multiple times.

By providing a start-up control system comprising a sensor, the flywheel can be automatically rotated towards the predefined launch position, which is more efficient, and much safer, especially when working late at night, after a long day of hard work.

By rotating backwards (in reverse direction), the auxiliary motor need not compress the crop material left behind in the bale chamber, thus the reverse rotation can be performed with relatively low power, and without having to empty the baler.

Because the flywheel and crank are moved to the predefined launch position, the start-up requirements are highly relaxed, and the baler design can benefit here from, e.g. by reducing the weight of the flywheel, without increasing the risk of start-up problems. A worst case dimensioning of the baler parts is no longer required.

A baler with the start-up system described above, requires a less powerful tractor than the same baler without the start-up system. Thus a smaller, less powerful tractor can be used to start-up the baler.

In a baler according to embodiments of the present invention, the predetermined launch position may be an angular position of the crank at an angular distance of less than 180°, measured in forward direction, with respect to the crank position in which the plunger is in its distal position, preferably less than 120°, more preferably less than 60°, even more preferably less than 30°.

By starting from such an angular position, the crank must rotate at least over 180° before the plunger reaches its distal position. The more time the flywheel has to accelerate during start-up, the higher its angular velocity, and the higher its kinetic energy will be at the first crop compression. This allows the flywheel to gain sufficient kinetic energy for guaranteed survival of the first "plunger impact", and thus provides for guaranteed start-up conditions without the risk of stalling the tractor engine.

In a baler according to embodiments of the present invention, the at least one sensor may be a pressure sensor for sensing a pressure exerted by the crop material on the plunger, and the control unit may be adapted for reversing the auxiliary motor until the sensed pressure is larger than a predetermined threshold pressure.

In a baler according to embodiments of the present invention, the auxiliary motor may be an electric motor, the sensor may be a sensor for measuring an operational parameter of the auxiliary motor, and the control unit may be adapted for reversing the auxiliary motor until the operational parameter is larger than a predetermined threshold parameter.

In a baler according to embodiments of the present invention, the at least one sensor may be selected from the group of an IR-sensor, a capacitive sensor, a magnetic sensor and an inductive sensor. An inductive sensor is particularly advantageous as it is simpler and cheaper than the other types of sensors. Such inductive sensor can be located on the main drive gearbox of the baler, and can be positioned to look at the metal crank arm or a metal plate attached thereto.

In a baler according to embodiments of the present invention, the at least one sensor may comprise a first and a second part, one part being located on the baler frame, the other part being located on the crank.

Locating the sensor parts on the frame has the advantage that it can be rigidly mounted, is easily accessible by electrical wires, and is subjected only to moderate centrifugal forces, shocks or vibrations.

A baler according to embodiments of the present invention may further comprise a local activation means for activating the start-up control system for rotating the flywheel in reverse direction to the predetermined launch position.

Such local activation means can e.g. be used by an operator standing next to the baler. Alternatively, as will be described further, the start-up control system may also be initiated remotely, e.g. by a tractor driver from within the tractor.

In embodiments of the present invention, the local activation means may be selected from the group of a button, a switch and a handle. A push-button is very suitable, since the control unit only needs a start-signal, and then takes over to automatically bring the baler in the desired launch position. When using a switch or a handle, the control unit may be provided for toggling the switch or handle back to its initial position when the launch position is reached.

In a second aspect, the present invention provides a tractor and baler combination, comprising the baler according to any embodiment of the first aspect of the present invention, and having an input shaft connectable to the flywheel; and a tractor having a PTO connectable to the input shaft of the baler.

Whereas in the prior-art a tractor-baler combination sometimes started up, and sometimes did not start-up, a tractor-and-baler combination with a start-up system according to embodiments of the present invention, will more often start up. Of course, if the tractor is not powerful enough, start-up will always fail.

In a tractor and baler combination according to embodiments of the present invention, the tractor may further comprise a remote activation means operatively connected to the start-up control system.

This offers the advantage that a tractor driver can, from his driving seat in the tractor, initiate the start-up control system for positioning the flywheel in the start-up position. The driver does not have to step down from the tractor, which is faster and safer. The remote activation means may be a separate activation means (e.g. a dedicated button), or may be integrated in other start-up circuitry.

In a third aspect, the present invention provides a method for upgrading an existing baler for rotating the flywheel to a predetermined launch position. The baler comprises a flywheel connectable to a tractor PTO and adapted for rotating in a forward direction for producing bales; and a plunger connected to the flywheel via a crank, and adapted for performing a reciprocal movement between a near position and a distal position in a bale chamber (80). The method comprises adding to the baler an auxiliary motor adapted for rotating the flywheel in a reverse direction; and adding to the baler a start-up control system comprising at least one sensor and one control unit, and connecting the control unit to the at least one sensor and to the auxiliary motor, the control unit being adapted for driving the auxiliary motor in reverse direction until the sensor provides a signal indicating that the predetermined launch position is reached.

This method is provided for balers not having an auxiliary motor for reversing the flywheel. By upgrading the baler, its start-up behavior can be improved.

In a further aspect, the present invention provides a method for upgrading an existing baler for rotating the flywheel to a predetermined launch position. The baler comprises a flywheel connectable to a tractor PTO and adapted for rotating in a forward direction for producing bales; and a plunger connected to the flywheel via a crank, and adapted for performing a reciprocal movement between a near position and a distal position in a bale chamber; and an auxiliary motor for rotating the flywheel in a reverse direction. The method comprises the step of adding to the baler a start-up control system comprising at least one sensor and one control unit, and connecting the control unit to the at least one sensor and to the auxiliary motor, the control unit being adapted for driving the auxiliary motor in reverse direction until the sensor provides a signal indicating that the predetermined launch position is reached.

This method is provided for balers already having an auxiliary motor for reversing the flywheel. By upgrading the baler, its start-up behavior can be improved.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to balers, reference is made to machines for forming bales from agricultural crop material, such as forming cuboid-shaped bales, also called rectangular bales, by any suitable means, e.g. plungers.

Where in embodiments of the present invention reference is made to crop material, reference is made to any suitable type of biomass that can be harvested and packed in bales, such as for example hay, silage, straw or other.

Where in embodiments of the present invention reference is made to pick-up assemblies, reference is made to assemblies which are adapted for picking up crop material, e.g. a windrow, from the ground and feeding it into a subsequent processing unit, e.g. a baling chamber, of an agricultural machine, for example an agricultural harvesting machine, such as a baler.

Where in embodiments of the present invention reference is made to "normal operation of the baler", the condition of the baler is meant wherein the flywheel is rotated in a direction for producing bales.

Where in embodiments of the present invention reference is made to "normal direction" or "forward direction" of the input shaft or the flywheel or the crank of the baler, the rotation direction of the flywheel during normal production of bales is referred to.

Similarly, where in embodiments of the present invention reference is made to "reverse direction" or "backward direction" of the input shaft or the flywheel or the crank of the baler, the rotation direction opposite to the normal direction is referred to.

Where in embodiments of the present invention reference is made to "plunger impact on the crop material", reference is made to the moment in time at which the reaction force exerted upon the plunger by the compressed crop material is above a predetermined threshold value, e.g. above 25 kN.

Where in embodiments of the present invention reference is made to "the distal position of the plunger in the bale chamber", that position is meant where the plunger is furthest away from its point of attachment to the crankshaft.

Where in embodiments of the present invention reference is made to "high density bales", bales with a density higher than 100, for example higher than 190 kg/m$^3$ are meant.

Figure 1:
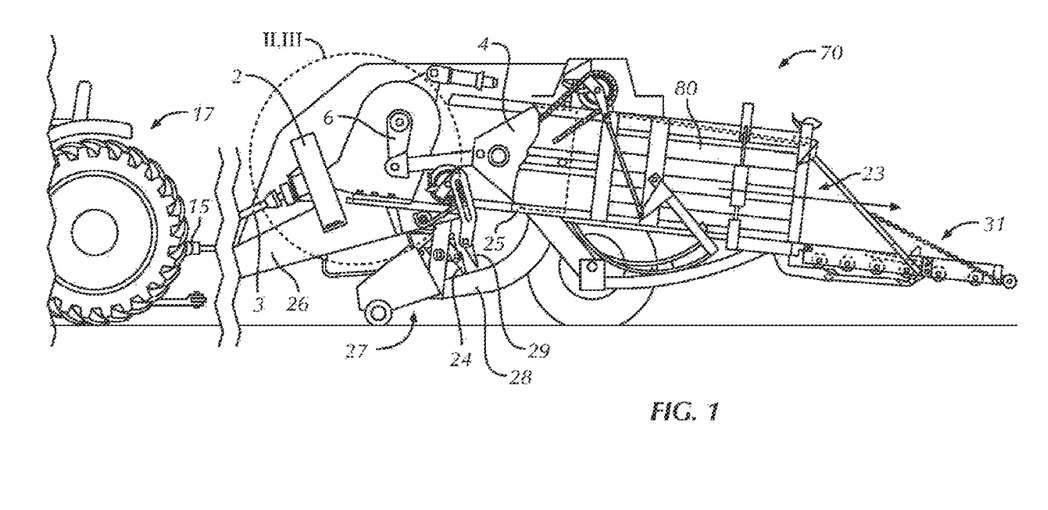
FIG. 1 is a side view of part of a classical tractor and a towable baler.

Referring to the drawings, FIG. 1 shows an example of an agricultural baler 70 comprising a frame 25 which is equipped with a forwardly extending tongue 26 at its front end with hitch means (not shown) for coupling the baler 70 to a towing tractor 17. A pick-up assembly 27 lifts windrowed crop material off the field as the baler 70 is travelled thereover, e.g. while being pulled by a tractor 17, and delivers such material into the front end of a rearwardly and upwardly curved, charge-forming feeder duct 28. The duct 28 communicates at its upper end with an overhead, fore-and-aft extending bale chamber 80 into which crop charges are loaded by a cyclically operating stuffer mechanism 29. A continuously operating packer mechanism 24 at the lower front end of the feeder duct 28 continuously feeds and packs material into the duct 28 so as to cause charges of the crop material to take on and assume the internal configuration of the duct 28 prior to periodic engagement by the stuffer mechanism 29 and insertion up into the bale chamber 80. The packer mechanism 24 may be replaced by a rotor mechanism which will also continuously feed and pack material into the duct 28. The feeder duct 28 may be equipped with means (not illustrated) for establishing whether a complete charge has been formed therein and for operating the stuffer mechanism 29 in response thereto. Each action of the stuffer mechanism 29 introduces a "charge" or "flake" of crop material from the duct 28 into the chamber 80.

A plunger 4 reciprocates in a fore-and-aft direction within the bale chamber 80, at least within a first part thereof. Biomass or crop material fed via the feeder duct 28 is thereby compacted, e.g. compressed or otherwise treated, so as to form bales in the above-described operation of the agricultural baler 70. Cuboid shaped bales, also known as "rectangular bales" are formed. The formed bales may then be moved forward by the reciprocating motion of the plunger 4 to shift serially and incrementally along the bale chamber 80 towards a discharge outlet 23, wherefrom the bales 16 may eventually be ejected. The baler 70 may furthermore comprise components such as a knotter mechanism for automatically tying the completed bales 16 with e.g. twine or similar lineal object to make them self-supporting, for example for shipping and storage. Once tied, the bales 16 are discharged from the discharge outlet 23 of the bale chamber 80 onto a discharge 31 in the form of a chute, for gently lowering the bales near ground level.

Large balers 70, especially rectangular balers for producing high-density bales have a flywheel 2 with a relatively large diameter (e.g. in the range of 75 to 130 cm, e.g. 110 cm) and heavy weight (e.g. in the range of 300 to 1000 kg, e.g. 700 kg) and high inertial mass or energy equivalent. When all crop material of one field is compacted into bales 16, the functioning of the baler 70 is temporarily stopped, e.g. by decoupling or disabling the tractor PTO so that the flywheel 2 will slow down until it stops, and the related functions, such as the pick-up, packer or rotor mechanism are deactivated also. The baler 70 is then brought to another field, usually while there is still some crop material left in the bale chamber 80. When arriving at the next field to be harvested, the baler 70 needs to be started up again, but it has been found, particularly with large balers having a large and heavy flywheel 2, that problems may arise due to the high inertia of the flywheel 2, especially when there is still crop material left in the bale chamber 80, which can be the case, since balers 70 are not always emptied between different fields.

Figure 2:
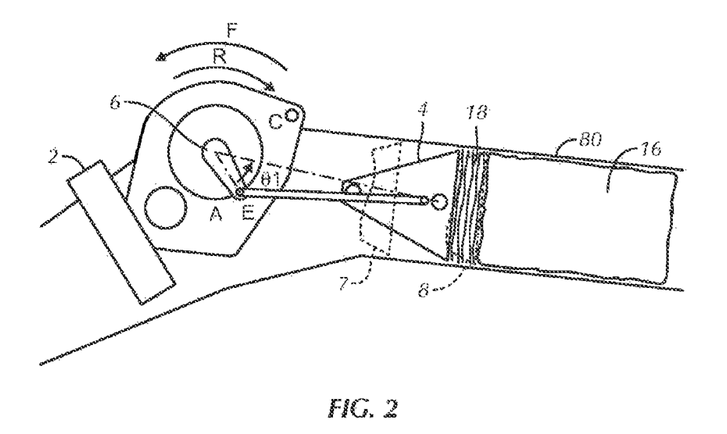
FIG. 2 is an enlarged view of part of the baler of FIG. 1, wherein the crank is in an unfavorable position E for start-up.

The inventors have found that the start-up problem occurs when the flywheel 2 does not "survive" or is not able to complete the first plunger impact on the crop material, i.e. when the plunger 4 stalls during the first compression cycle of the crop material in the bale chamber 80, shortly after start-up. An example of such a start-up position where this occurs is illustrated in FIG. 2 showing the initial condition of the crank 6 and plunger 4 just before the baler 70 is started. In the example of FIG. 2, the crank 6 is located at an angular distance $\theta 1$ of approximately −45° with respect to the position the crank 6 would assume when the plunger 4 is in its distal position 8 inside the bale chamber 80. Hence the crank 6 has to rotate over about 45° before the plunger 4 reaches its distal position. When the baler 70 is started from this initial condition of the crank 6 and plunger 4, the flywheel 2 cannot gain sufficient speed before the plunger 4 impacts or reaches the crop material 18, e.g. straw or silage, in the bale chamber 80, and the tractor engine stalls or the safety mechanism declutches the PTO 15 from the tractor engine, resulting in a start-up failure of the baler 70.

During tests, the inventors noted that, when switching-off the baler 70, and letting it slow down freely, the flywheel 2 and crank 6 tended to automatically rotate to an unfavorable condition, e.g. A or E in FIG. 2, corresponding to an angle $\theta 1$ of about −90° and about −45° respectively, because of the gravity force acting on the heavy crank-arms 6.

Figure 3:
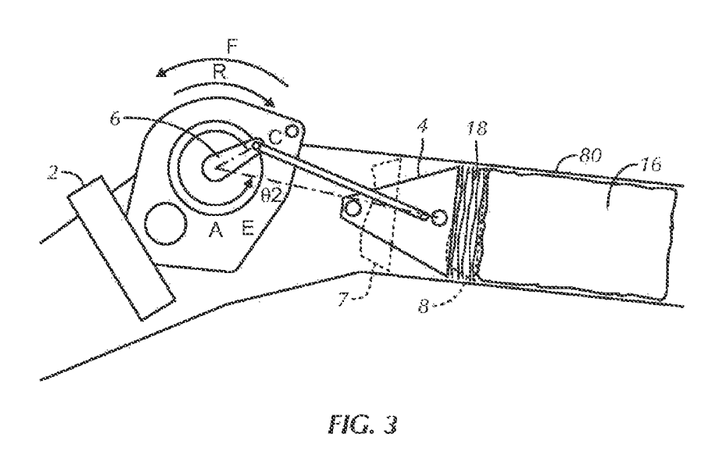
FIG. 3 is an enlarged view of part of the baler of FIG. 1, wherein the crank is in a favorable position C for start-up.

The inventors also found that, when the baler 70 was started from a favorable crank position, e.g. crank position C in FIG. 3, it was found that the start-up of the baler 70 never failed. In position C of FIG. 3, the crank 6 shows an angle $\theta 2$ at an angular distance of about 300° with respect to the position the crank 6 will assume after rotating the flywheel 2 in forward direction F until the plunger 4 reaches its distal position 8 inside the bale chamber 80.

Figure 4:
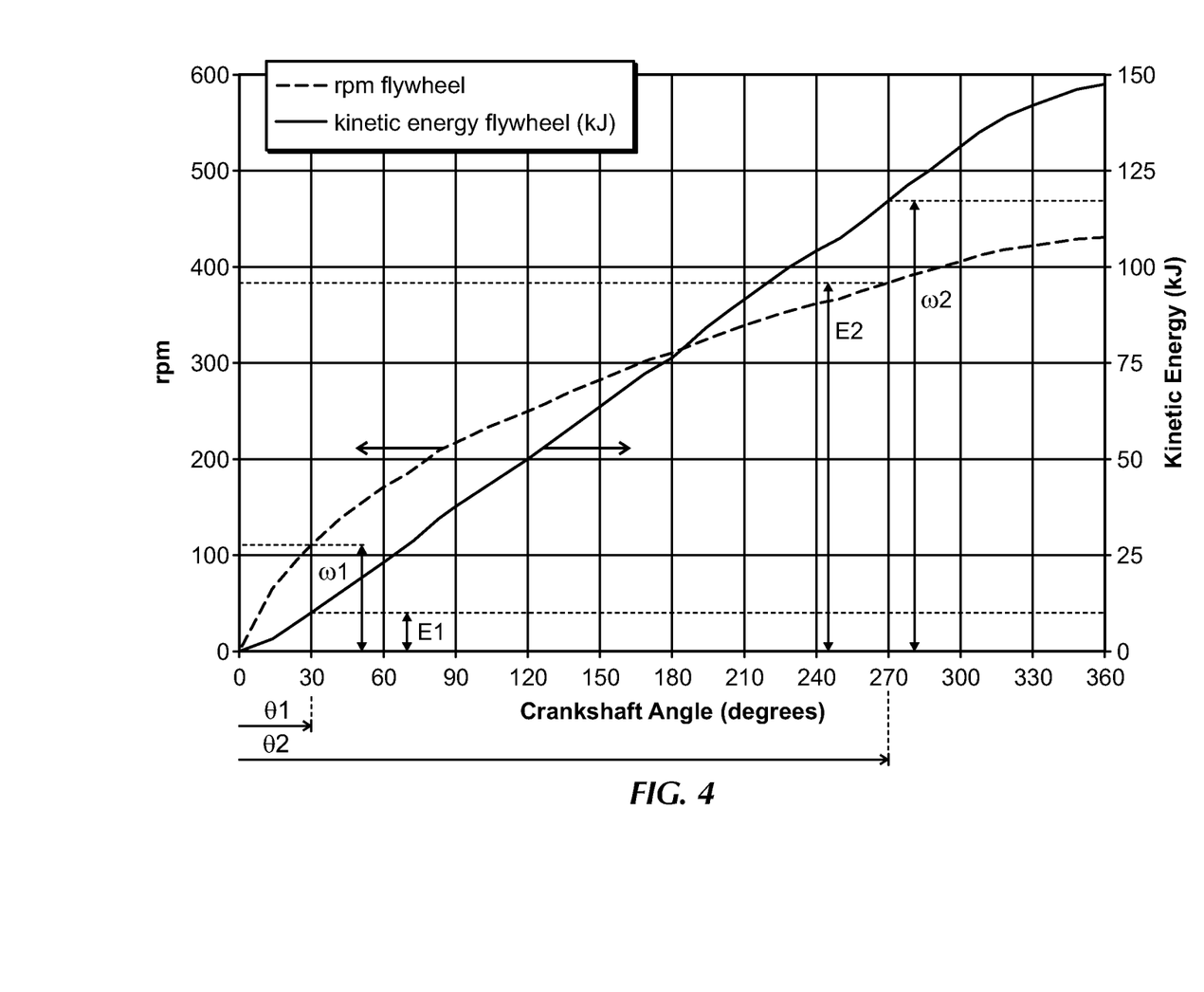
FIG. 4 shows an example of the speed and corresponding kinetic energy of a flywheel of an empty baler at start-up.

This behavior was further investigated, and the start-up behavior of a flywheel 2 of a particular empty baler 70 and a particular tractor 17 combination, wherein the start-up sometimes failed, was measured, as shown in FIG. 4. The skilled person can easily make similar curves for other tractor 17 and baler 70 combinations, provided of course the tractor 17 has sufficient power to start-up the baler 70 under best-case conditions. In the particular case of FIG. 4, the empty baler 70 was started with its crank 6 in the position A, but another start-position could also be used, and the angular speed $\omega(t)$ of the flywheel 2 was measured, and plotted as shown in FIG. 4. On the horizontal axis the relative angular position $\theta$ of the crank 6 is shown with respect to its starting position. The angular velocity $\omega(t)$ of the flywheel 2 is shown on the left vertical axis, while the corresponding kinetic energy of the flywheel 2 is shown on the right vertical axis. Note that, due to the gearbox transmission ratio, the flywheel 2 rotates multiple times for each crank rotation. Only the first full revolution of the crank 6 after start-up is shown, which corresponds to a plurality of revolutions of the flywheel 2, e.g. 18 to 28 revolutions. As can be seen from FIG. 4, after the crank 6 has rotated over 30°, the kinetic energy E1 of the flywheel 2 after start-up is about 10 kJ, and the angular velocity $\omega 1$ of the flywheel 2 is about 110 rpm. When the crank 6 has rotated over 270°, the kinetic energy E2 of the flywheel 2 is about 115 kJ, and the angular velocity $\omega 2$ of the flywheel 2 is about 380 rpm. The exact numbers are not important, but it is clear from this example that the more time the baler has before the first impact, the larger the angular velocity. In the example the angular velocity ratio $\omega 2/\omega 1$ is about 380/110=3.45, but as kinetic energy (for a pure rotational movement) is proportional to the square of angular velocity, the kinetic energy ratio E2/E1 is about 115/10=11.5. This example shows that, when starting from a favorable start-position (also called "launch position"), the kinetic energy of the flywheel 2 before the first impact of the plunger 4 into the crop material 18 inside the bale chamber 80 can be increased by a factor of 11.5 (more than ten), as compared to starting from an unfavorable position, such as e.g. crank position A in FIG. 3. It is to be noted that the kinetic energy curve shown in FIG. 4, at least for the first revolution of the crank 6, is monotonically increasing with the crank shaft angle $\theta$. Thus the larger the value of $\theta$, the more kinetic energy the flywheel 2 will have before the "first impact", i.e. before the plunger 4 reaches its distal position 8 in the baler chamber 80.

The principle behind the present invention is to provide a baler 70 wherein the flywheel 2 has gained sufficient kinetic energy before the first impact of the plunger 4 on the crop material 18 in the bale chamber 80, or, more accurately stated, since the amount of crop material 18 in the bale chamber may be a variable quantity and may even be absent, before the plunger 4 reaches its distal position 8. This is obtained by rotating the flywheel 2 in reverse direction R (i.e. backwards) from whatever position the crank 6 was stopped, (e.g. position E in FIG. 2) to a predetermined launch position (e.g. position C in FIG. 3). To make sure that the flywheel 2 is reversed safely, correctly and efficiently, in accordance with embodiments of the present invention it is performed automatically by means of a start-up control system 1 comprising at least one sensor 11 for determining a position of the crank 6, and a control unit 12 connected to an output of the sensor 11, the control unit being adapted for controlling an auxiliary motor 5 for rotating the flywheel 2 in reverse direction R until the crank 6 reaches the predetermined launch position. When starting from this launch position, the risk of start-up problems is reduced, if not completely eliminated.

Thus, assuming the crank 6 is in position C (FIG. 3), the baler 17 can now be started, e.g. by coupling or engaging the baler input shaft 3 to a tractor PTO 15 (FIG. 1). The flywheel 2 is driven in normal (i.e. forward) direction F from crank position C (predetermined launch position), and by the time the plunger 4 reaches the crop material 18, the flywheel 2 will have gained sufficient kinetic energy to compress the crop material 18 and to continue rotating. During the first compression, the flywheel 2 will indeed lose part of its kinetic energy (e.g. 0 to 25 kJ, depending on the amount and condition of the crop material 18 in the bale chamber 80), but thanks to the start from the predetermined launch position, a sufficient amount of kinetic energy will remain, despite the energy lost during the compression, so that the flywheel 2 can continue rotating. The flywheel will typically decelerate until the plunger 4 has reached its distal position 8, but will accelerate again to increase its kinetic energy for the next compression. Since the crank 6 now has almost a full revolution, it will not only recover the energy lost during the first impact, but will accelerate further, etc, and continue accelerating during the next revolutions until it has reached its nominal speed (e.g. 1000 rpm).

Figure 5:
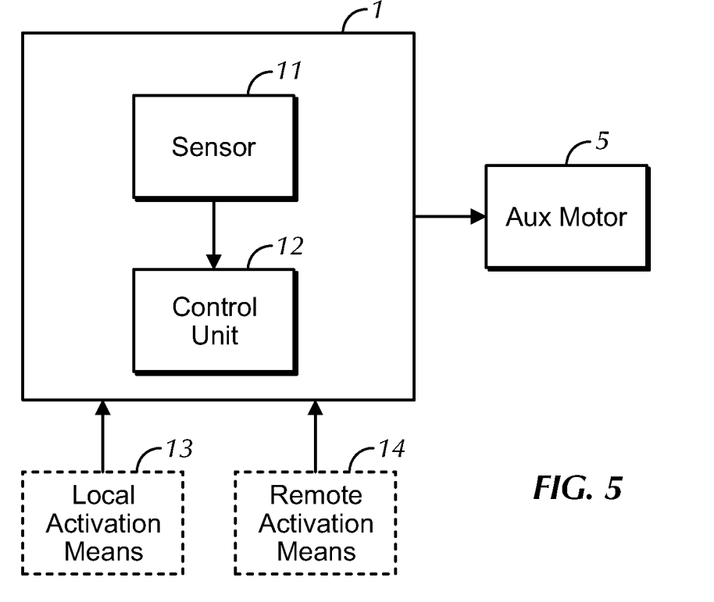
FIG. 5 schematically shows a start-up control system as part of the baler of the present invention.

In an embodiment of the start-up system, the sensor 11 is a pressure sensor adapted for sensing the pressure exerted by the crop material 18 on the plunger 4, and the control unit 12 is adapted for reversing the auxiliary motor 5 until the sensed pressure is equal to or larger than a predetermined threshold pressure. This method would not work for an empty baler 70, but there is no start-up problem for an empty baler, and the control unit 12 can easily be designed to incorporate this condition, e.g. when the motor 5 has been activated longer than a predetermined time without the threshold value being encountered, then the reversing may stop, as any start-up position would then be a valid launch-position.

A similar behavior can be achieved by using an electric auxiliary motor 5, and by measuring an operational parameter, e.g. current as an indication of the torque exerted by the auxiliary motor against the pressure exerted by the crop material 18 in the bale chamber 80. When the operational parameter, e.g. current reaches a predetermined threshold value, the control unit 12 would stop reversing.

In another embodiment the predetermined launch position is chosen as a position wherein the crank 6 shows an predetermined angular distance, measured in forward (positive) direction F, to the position the crank 6 would assume when the plunger 4 is in its distal position 8. The predetermined angular distance θ is preferably in the range of 0° to 180°, preferably less than 120°, or less than 90°, or less than 60°, or less than 30°. Angles larger than 120° would also work, but may require a more powerful auxiliary motor 5 for compressing the crop material 18. Angles larger than 180°, e.g. 200°, may also work, but are not recommended, because the flywheel 2 will gain less kinetic energy, thus increasing the risk of stalling.

Different kinds of sensors 11 may be used, e.g. the sensor 11 may be an IR-sensor, or a capacitive sensor or a magnetic sensor or an inductive sensor, or any other suitable type of sensor known to the person skilled in the art. The sensor may have, but does not need to have, multiple cooperating parts, e.g. an IR transmitter and IR receiver. The sensor or sensor parts may be located on several locations, e.g. the flywheel 2, the baler frame 25, the crank 6, the bale chamber 80, the plunger 4, etc. For example, in an embodiment an IR-transmitter is mounted on the crank 6, and an IR-receiver is mounted on the frame 25, or vice versa. In another example an inductive transmitter is mounted on the crank 6, and an inductive receiver is mounted on the frame 25. In another example, a first magnetic sensor part is mounted to the plunger 4, and another magnetic sensor part is mounted to the bale chamber 80. In yet alternative embodiments, a sensor is provided e.g. on the plunger to look at the chamber, or a sensor is provided in the chamber to look at the plunger.

The sensor 11 may be of a type that provides an ON/OFF signal, e.g. a pulse, indicative of the crank 6 being in the predefined position or not. The sensor 11 may also be of a kind that cooperates with an encoder for determining an absolute position, e.g. the absolute angle of the crank 6, or the absolute angle of the flywheel 2, which may be converted to the absolute crank position taking into account the gearbox transmission ratio. One or more sensors 11 may be used, for example two sensors 11 arranged for detecting not only the position of the plunger 4, but also its direction of movement.

In a simple example of the start-up control system 1, a sensor 11 is mounted on the baler frame 25 near position C and adapted for providing a first signal (e.g. a current of a first predetermined value, e.g. 20 mA) when the crank 6 is at an angle θ between 35° and 55°, measured in forward direction F, to the position the crank 6 would assume when the plunger 4 is in its distal position 8, and adapted for providing a second signal (e.g. a current of a second predetermined value, e.g. 4 mA) otherwise. The control unit 12 of the start-up control system 1 would wait for a command given by the operator, e.g. by pushing a local activation means such as button 13 for preparing the baler for start-up, the control unit 12 would activate the sensor 11, and would receive a signal indicative of the position of the crank 6. If the sensor 11 outputs a signal of the first predetermined value, the control unit 12 would not activate the auxiliary motor 5, because the crank 6 is already in the predefined launch position. However, if, and as long as the control unit 12 receives a signal of the second predetermined value, it would drive the auxiliary motor 5 in reverse direction R, e.g. at constant speed, for rotating the flywheel 2 and the crank 6 to the predetermined launch position, until it receives the signal with the first predetermined value from the sensor 11, and then it stops the auxiliary motor 5. The baler 17 is then ready for start-up. Alternatively, the reversing action may be combined with a start-up action, i.e. that when the operator pushes a button for starting up the baler 70, the start-up system would first reverse the flywheel 2 until the baler is in the predefined launch position, and would then automatically start-up the baler 70 or give the signal to the operator to engage the PTO clutch.

In a variant of this simple start-up control system 1, the control unit 1 is adapted for driving the auxiliary motor 5 further for a predefined time period after receiving the first signal from the sensor 11. By doing so, the launch position may be adaptable or programmable by making use of a timer, without having to replace the sensor(s). Another advantage would be that the sensor 11 can be placed at a more convenient location, without affecting the launch position.

More sophisticated control units 12 may be used, e.g. not using a constant reversing speed, but accelerating and decelerating the auxiliary motor 5 for minimizing the time required to move the baler to the predetermined launch position. In an embodiment, the auxiliary motor 5 is adapted for being operatively coupled to the flywheel 2 for reversing, and decoupled from the flywheel 2 when the baler is in normal operation mode. In an embodiment, the control unit 12 is adapted for outputting a warning signal, e.g. a sound or a light signal, while rotating back the crank 6. In an embodiment, the control unit 12 is adapted for providing a "ready"-signal when the launch position is reached, such that the operator will engage the PTO clutch.

The start-up control system 1 is to be used only when the flywheel 2 is standing still. It may have an additional sensor for checking if the flywheel 2 is actually standing still before engaging the auxiliary motor 5. The start-up control system 1 needs to be initiated or activated, e.g. by means of a local activation means 13, e.g. a push-button mounted on the baler frame 25. In an embodiment the start-up control system 1 is activated from a remote activation means 14, e.g. a switch or handle in a tractor 17 connected to the baler 70, or even on the baler control monitor which is installed on a touch screen in the tractor cab. Instead of a stand-alone switch or handle, the remote activation means 14 may also be integrated in control circuitry of the tractor. For example, it may be integrated in such a way that a single command for starting the baler 70 automatically first activates the start-up control system 1 for reversing the flywheel 2 for positioning the crank 6 in the predetermined launch position, then waits for a "ready"-signal from the start-up control system 1, and to then automatically start-up the baler 70, all by a single command.

The auxiliary motor 5 may be e.g. a hydraulic or an electric motor. It may be permanently connected to the input shaft 3 or flywheel 2 of the baler 70, or may be adapted for being decoupled from the input shaft 3 and flywheel 2 during normal baler operation, for avoiding any negative influence, such as energy loss or wear.

Thanks to the start-up control system 1 described above, tractor 17 and baler 70 combinations have a reduced risk of the tractor engine stalling or the PTO overload mechanism being activated during start-up of the baler 70. Furthermore, the start-up control system 1 allows less powerful tractors 17 to be used with a given type of baler 70.

Also provided is a method for upgrading an existing baler for improving its start-up behavior. In a first embodiment of the method for upgrading an existing baler, the baler 70 already has an auxiliary motor 5 capable of driving the flywheel 2, in which case a start-up control system 1 comprising at least one sensor 11 and the control unit 12 is added to the baler 70, preferably along with a local or remote activation means. In a second embodiment of the method for upgrading an existing baler 70, the baler does not yet have an auxiliary motor 5 capable of reversing the flywheel 2. In that case also an auxiliary motor 5 is to be added additionally to the baler 70.

The invention claimed is:

1. A baler comprising:
   a shaft, and a flywheel connected to the shaft and adapted for rotating in a forward direction for producing bales;
   a plunger connected to the flywheel via a crank, the plunger adapted for performing a reciprocal movement between a near position in which crop material may be added in a bale chamber, and a distal position in which the crop material is compressed in the bale chamber;
   an auxiliary motor connectable to the flywheel for starting up rotation of the flywheel;
   a start-up control system, comprising: at least one sensor indicative for a position of the crank and a control unit connected to the at least one sensor and adapted for controlling the auxiliary motor for rotating the flywheel in a reverse direction to a predetermined launch position.

2. The baler according to claim 1, wherein the predetermined launch position is an angular position of the crank at an angular distance of less than 180°, measured in forward direction, with respect to the crank position in which the plunger is in the distal position.

3. The baler according to claim 1, wherein the at least one sensor is a pressure sensor configured for sensing a pressure exerted by the crop material on the plunger, and wherein the control unit is adapted for reversing the auxiliary motor until the sensed pressure is larger than a predetermined threshold pressure.

4. The baler according to claim 1, wherein the auxiliary motor is an electric motor, and wherein the sensor is a sensor configured for measuring an operational parameter of the auxiliary motor, and wherein the control unit is adapted for reversing the auxiliary motor until the operational parameter is larger than a predetermined threshold parameter.

5. The baler according to claim 1, wherein the at least one sensor is selected from the group of an IR-sensor, a capacitive sensor, a magnetic sensor and an inductive sensor.

6. The baler according to claim 1, wherein the at least one sensor comprises a first and a second part, the first part located on a baler frame, the second part located on the crank.

7. The baler according to claim 1, further comprising a local activation input for activating the start-up control system for rotating the flywheel in reverse direction to the predetermined launch position.

8. The baler according to claim 7, wherein the local activation input is selected from the group of a button, a switch and a handle.

9. The baler according to claim 1, in combination with a tractor
   wherein the baler further comprises an input shaft connectable to the flywheel and the tractor comprising a PTO connectable to the input shaft of the baler.

10. The baler according to claim 9, wherein the tractor further comprises a remote activation input operatively connected to the start-up control system.

11. Method for upgrading a baler for rotating a flywheel to a predetermined launch position,
    the baler comprising the flywheel connectable to a tractor PTO and adapted for rotating in a forward direction for producing bales; and a plunger connected to the flywheel via a crank, and adapted for performing a reciprocal movement between a near position and a distal position in a bale chamber;
    the method comprising:
    a) providing an auxiliary motor adapted for rotating the flywheel in a reverse direction;
    providing a start-up control system comprising at least one sensor and one control unit connecting the control unit to the at least one sensor and to the auxiliary motor,
        wherein the control unit being adapted for driving the auxiliary motor in reverse direction until the sensor provides a signal indicating that the predetermined launch position is reached.

12. Method for upgrading a baler for rotating a flywheel to a predetermined launch position,
    the baler comprising the flywheel connectable to a tractor PTO and adapted for rotating in a forward direction for producing bales; and a plunger connected to the flywheel via a crank, and adapted for performing a reciprocal movement between a near position and a distal position in a bale chamber; and an auxiliary motor for rotating the flywheel in a reverse direction;
    the method comprising providing a start-up control system to the baler comprising at least one sensor and one control unit, and connecting the control unit to the at least one sensor and to the auxiliary motor, the control unit being adapted for driving the auxiliary motor in reverse direction until the sensor provides a signal indicating that the predetermined launch position is reached.

\* \* \* \* \*